United States Patent
Haupt

(10) Patent No.: US 9,163,646 B2
(45) Date of Patent: Oct. 20, 2015

(54) HYDRAULIC VALVE SYSTEM FOR ACTUATING AT LEAST ONE SHIFTING ELEMENT OF A TRANSMISSION

(71) Applicant: ZF Friedrichshafen AG, Friedrichshafen (DE)

(72) Inventor: Josef Haupt, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 423 days.

(21) Appl. No.: 13/667,210

(22) Filed: Nov. 2, 2012

(65) Prior Publication Data

US 2013/0126766 A1    May 23, 2013

(30) Foreign Application Priority Data

Nov. 18, 2011   (DE) .......................... 10 2011 086 655

(51) Int. Cl.
| | |
|---|---|
| F15B 13/04 | (2006.01) |
| F16K 11/076 | (2006.01) |
| F16K 11/07 | (2006.01) |
| F16H 61/02 | (2006.01) |

(52) U.S. Cl.
CPC ........ F15B 13/0403 (2013.01); F16H 61/0276 (2013.01); F16K 11/0716 (2013.01); F16H 2061/0279 (2013.01); Y10T 137/87193 (2015.04)

(58) Field of Classification Search
CPC ............. F15B 13/0403; F16H 61/0276; F16H 2061/0279; F16K 11/0716; Y10T 137/87193
USPC ............. 251/28, 25; 137/102, 596.18, 596.14
See application file for complete search history.

(56) References Cited

U.S. PATENT DOCUMENTS

| | | | | |
|---|---|---|---|---|
| 2,619,118 | A * | 11/1952 | Adams ..................... | 137/625.68 |
| 2,781,053 | A * | 2/1957 | Berninger et al. ......... | 137/492.5 |
| 2,888,943 | A * | 6/1959 | Hipple ............................ | 137/106 |
| 2,997,996 | A * | 8/1961 | Russey et al. .................. | 477/99 |
| 3,136,328 | A * | 6/1964 | Hipp ........................ | 137/115.08 |
| 3,515,163 | A * | 6/1970 | Freeman ....................... | 137/102 |
| 3,967,635 | A * | 7/1976 | Sealfon et al. ................ | 137/102 |
| 4,041,970 | A * | 8/1977 | Peters ........................... | 137/102 |

(Continued)

FOREIGN PATENT DOCUMENTS

DE   103 33 236 A1   2/2005

OTHER PUBLICATIONS

Raw Machine translation of DE10333236A1 ("Volkswagen" published on Feb. 17, 2005) provided by the EPO.*

(Continued)

*Primary Examiner* — Craig Schneider
*Assistant Examiner* — David Colon Morales
(74) *Attorney, Agent, or Firm* — Davis & Bujold, P.L.L.C.; Michael J. Bujold

(57) ABSTRACT

A valve device (14) of a hydraulic system (1) for actuating at least one shifting element (2) of a transmission. The valve device comprising a pilot-controlled control valve device (3) with a valve slide (9) and, functionally connected with this is, an also pilot-controlled switching valve device (4) which is also formed with a valve slide (7). The valve slides (7, 9) are arranged to move longitudinally in a common bore (15) of a valve housing (16) and are positioned coaxially with one another, and an inner valve slide (7) is arranged to move longitudinally at least partially within the outer valve slide (9).

15 Claims, 8 Drawing Sheets

(56) References Cited

U.S. PATENT DOCUMENTS

| | | | | |
|---|---|---|---|---|
| 4,116,389 | A | * | 9/1978 | Furtah et al. ............... 239/132.5 |
| 4,478,237 | A | * | 10/1984 | Blake et al. ................ 137/116.3 |
| 4,554,947 | A | * | 11/1985 | Cobb, III ................. 137/596.18 |
| 4,620,560 | A | | 11/1986 | Coutant |
| 5,429,560 | A | * | 7/1995 | VanSelous et al. ........... 477/127 |
| 6,412,392 | B1 | * | 7/2002 | Gunter et al. ................. 91/433 |
| 6,634,377 | B1 | * | 10/2003 | Stafford .................... 137/454.2 |
| 7,282,005 | B2 | | 10/2007 | Shimizu et al. |
| 2008/0072977 | A1 | * | 3/2008 | George et al. .............. 137/625.6 |
| 2010/0071791 | A1 | * | 3/2010 | Schiel et al. ............. 137/625.69 |
| 2010/0224803 | A1 | * | 9/2010 | Stafford et al. ................. 251/14 |

OTHER PUBLICATIONS

Raw Machine translation of DE10333236A1 ("Volkswagen" published on Feb. 17, 2005) provided by the Google Translate.*

Human Translation of DE10333236A1 ("Volkswagen" published on Feb. 17, 2005, translation provided by Schreiber Translations, Inc.).*

German Search Report from corresponding German Application No. 10 2011 086 655.8.

\* cited by examiner

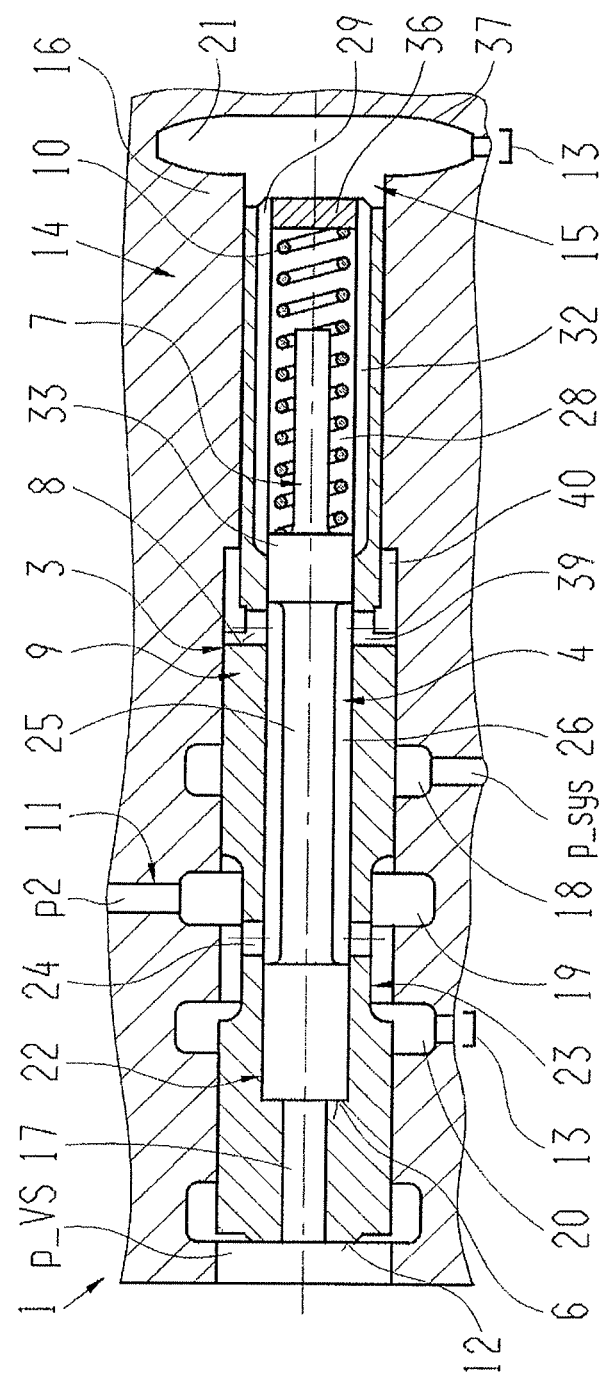
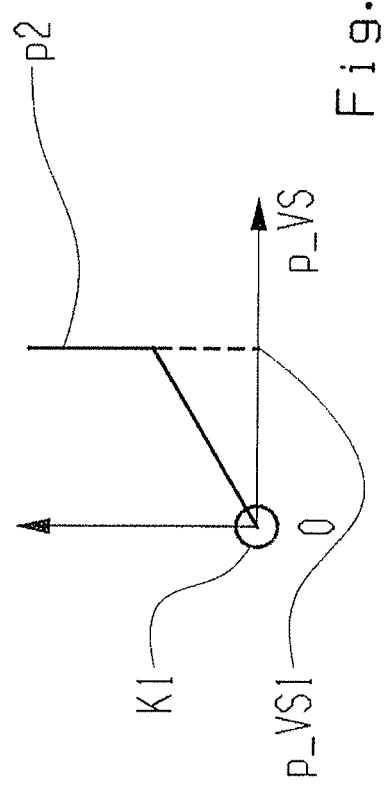
Fig. 2
Fig. 3

HYDRAULIC VALVE SYSTEM FOR ACTUATING AT LEAST ONE SHIFTING ELEMENT OF A TRANSMISSION

This application claims priority from German patent application serial no. 10 2011 086 655.8 filed Nov. 18, 2011.

FIELD OF THE INVENTION

The invention concerns a valve device of a hydraulic system for actuating at least one shifting element of a transmission.

BACKGROUND OF THE INVENTION

U.S. Pat. No. 7,282,005 B2 describes a hydraulic system for actuating a shifting element of a transmission, having a pilot-controlled control valve device comprising a valve slide and, functionally connected therewith, an also pilot-controlled switching valve device that is also made with a valve slide. By means of a pressure regulating device, the pilot pressure for the control valve device and the switching valve device is set as a function of an electric control signal, such that the pressure regulating device has a defined working pressure range which is usually substantially lower than the actuating pressure of the shifting element. To enable actuating the shifting element with higher pressure values compared with the pilot pressure of the control valve device and the switching valve device, the control valve device is connected downstream from the pressure regulating device, in the area of which the pilot pressure of the pressure regulating device is converted to a higher level.

In general, during the driving operation of a vehicle made with a transmission such as a converter automatic transmission or the like, it must be ensured that in its fully engaged operating condition, a shifting element is operating at its full transmission capacity without slip. For this, at the end of the actuating pressure control pressure range, the actuating pressure is increased abruptly to a higher pressure value, which usually corresponds to a so-termed system pressure. The switch-over or at least approximately abrupt raising of the actuating pressure is effected by means of the switching valve device that is controlled in parallel by the pressure regulating device, which however is only actuated or changed from a first to a second switch condition at high pilot pressures.

By means of the switching valve device, the back-coupling of the actuating pressure to the control valve device is deactivated when the switching valve device is in a second switch condition, so that the control valve device is changed from a so-termed modulation position to an operating condition in which the system pressure applied at the control valve device is completely routed through in the direction toward the shifting element.

Since the valve slide of the control valve device and the valve slide of the switching valve device are respectively arranged in separate valve bores, a hydraulic system, formed in such manner, takes up an undesirably large amount of space.

SUMMARY OF THE INVENTION

Accordingly, the purpose of the present invention is to provide a compact valve device of a hydraulic system for actuating at least one shifting element of a transmission.

The valve device, according to the invention, of a hydraulic system for actuating at least one shifting element of a transmission, is made with a pilot-controlled control valve device comprising a valve slide and, functionally connected therewith, a switching valve device which is also pilot-controlled and made with a valve slide.

According to the invention, in a space-saving manner the valve slides are located coaxially with one another and able to move longitudinally in a common bore of a valve housing, and an inner valve slide is arranged to move longitudinally at least partially inside the other, outer valve slide.

By virtue of the arrangement of the two valve slides according to the invention, i.e. their coaxial positioning and the at least partial nesting of the two valve slides one inside the other in a common bore of the valve housing, the valve device according to the invention is characterized by a more compact structure than the systems known from the prior art, in which the valve slide of the control valve device and the valve slide of the switching valve device are each located in separate bores. Accordingly, transmissions made with the valve device can also be constructed with smaller dimensions and then have a lower overall weight.

If the valve slides in each case can be acted upon in the area of a functional surface with a pilot pressure, such that the pilot pressure can be applied on the functional surface of the inner valve slide via an axial bore of the outer valve slide, which is arranged in the outer valve slide in the area having the functional surface that can be acted upon by the pilot pressure, then the valve device according to the invention with an integrated configuration of the control valve and the switching valve can be made with the same number of connection points as the systems known from the prior art which have separate control and switching valve devices, wherein the valve device according to the invention provides the same functions that can be obtained with the known designs. Moreover, owing to the integrated design, duct configuration complexity in the area of the hydraulic system of a transmission is simplified when the valve device according to the invention is used, as compared with systems known from the prior art in which the control valve and the switching valve are made separately.

In a further embodiment of the valve device according to the invention that can be operated with little control and regulation effort, the inner valve slide is acted upon by a spring device with a restoring spring force that acts in the direction of a defined initial position.

If the spring device is supported at one end on the inner valve slide and at the other end on the outer valve slide, actuation of the inner valve slide by the pilot pressure is independent of the pilot pressure actuation of the outer valve slide.

If a supply pressure signal can be applied at a first shifting tongue of the valve housing which can be brought into functional connection, via a reduced-diameter section of the outer valve slide, with a second shifting tongue with which a working pressure area of the shifting element is connected, then in a simply designed manner connecting ducts are provided between the control valve and the switching valve at least partially in the area between the valve slides and between the valve housing and not in the area of the valve housing.

In a further simply designed embodiment of the valve device according to the invention, the second shifting tongue can be brought into functional connection via the reduced-diameter section of the outer valve slide with a third shifting tongue, which is connected to a low-pressure area.

If the second shifting tongue can be connected, via a bore in the area of the reduced-diameter section of the outer valve slide and via a reduced-diameter section of the inner valve slide, which together with the outer valve slide delimit an annular space, to a functional surface of the outer valve slide in the area of which the pressure of the working pressure area can be applied to the outer valve slide in an action direction that opposes the pilot pressure, then the pressure of the working pressure area can, on the one hand, be pilot-controlled by means of the pilot control pressure applied on the valve slide of the switching valve device and on the valve slide of the control valve device, and can be selectively adjusted to the desired extent as a function of the pressure of the working pressure area fed back to the functional surface of the outer valve slide via the two valve slides.

In an embodiment comprising all the connecting ducts between the control valve device and the switching valve device in the area between the valve slides and between the valve housing and the valve slides, the annular space can be connected, via the inner valve slide, to a further annular space delimited by the inner valve slide and the outer valve slide, which space is connected to the low-pressure area.

In a further advantageous embodiment of the valve device according to the invention, the valve characteristic of the control valve device can be varied in a simply designed manner, whereby for this the pressure of the working pressure area of the shifting element can be regulated by means of the control valve device within a defined pilot pressure range and when the switching valve is in a first switch condition, whereas above a pilot pressure value that can be applied on the functional surface of the valve slide of the switching valve device, the switching valve is in a second switch condition, in which the pressure of the working pressure area of the shifting element corresponds to the supply pressure that can be applied at the control valve device.

If the valve housing is made of aluminum, preferably an aluminum casting alloy, the valve device according to the invention can be made inexpensively and with a low component weight.

In further embodiments of the valve device according to the invention characterized by low component weight, at least the outer valve slide is made of aluminum, preferably an aluminum casting alloy, and/or at least the inner valve slide is made of aluminum, preferably an aluminum wrought alloy.

In an embodiment of the valve device according to the invention characterized by high durability, an outer envelope surface of the outer valve slide that co-operates with the valve housing and an outer envelope surface of the inner valve slide that co-operates with the inner envelope surface of the outer valve slide are preferably strengthened by hard anodizing, whereas preferably an inner envelope surface of the valve housing that co-operates with the outer envelope surface of the outer valve slide and the inner envelope surface of the outer valve slide are made soft in the tribological sense.

In an embodiment of the valve device according to the invention that is space-saving, simply designed, and that can be operated with little control and regulation effort, the outer valve slide is the valve slide of the control valve and the inner valve slide is the valve slide of the switching valve.

The characteristics indicated in the following example embodiments of the valve device according to the invention are in each case, whether considered in isolation or in any desired combination with one another, suitable as further developments of the object of the invention. In relation to the further development of the object of the invention the respective combinations of characteristics do not have any restrictive force, but are presented only as examples.

Further advantages and advantageous embodiments of the valve device according to the invention emerge from the example embodiments whose principle is described below with reference to the drawings; for the sake of clarity, in the description of the various example embodiments the same indexes are used for components having the same structure and function.

BRIEF DESCRIPTION OF THE DRAWINGS

The drawing shows:

FIG. 2: A detailed longitudinally sectioned view of a first embodiment of the valve device of the hydraulic system shown in FIG. 1, in a first operating condition;

FIG. 3: Variation of a pressure of a working pressure area by which the shifting element can be actuated, by virtue of a pilot pressure that can be applied at the valve device;

DETAILED DESCRIPTION OF THE PREFERRED EMBODIMENTS

Figure 1:
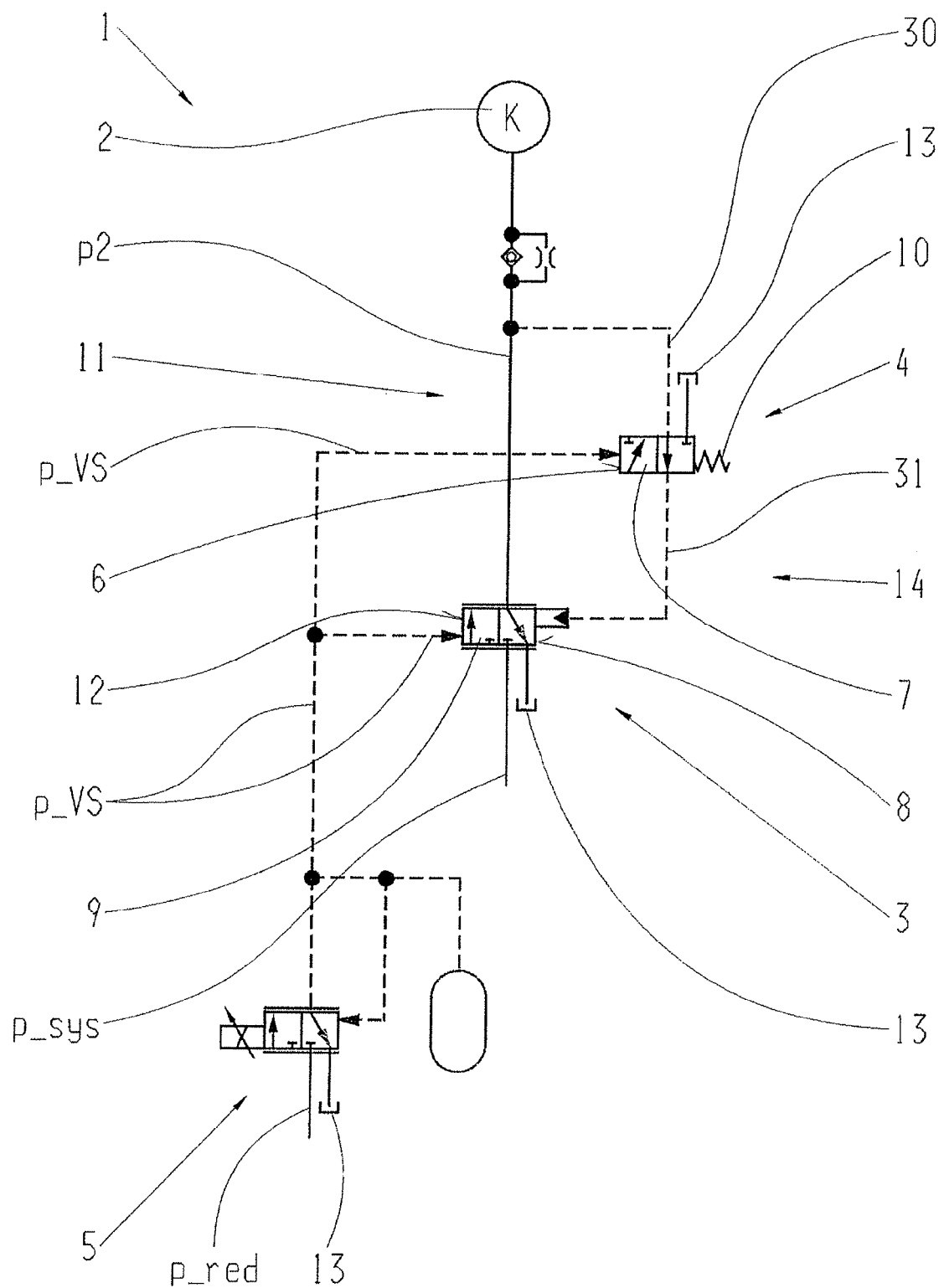
FIG. 1: Part of a hydraulic system made with a valve device for actuating at least one shifting element of a transmission.

FIG. 1 shows part of a hydraulic system 1 for actuating a shifting element 2 of a transmission, wherein in the present case the shifting element 2 is a hydraulically actuated friction clutch of the transmission. As a function of a pressure or actuating pressure p2 that can be applied to the shifting element 2, the transmission capacity of the shifting element 2 can be varied between a value equal to zero and a maximum value.

The actuating pressure p2 of the shifting element 2 can be adjusted by means of a pilot-controlled control valve device 3 or clutch valve and functionally connected to it, an also pilot-controlled switching valve device 4 or holding valve. A pilot pressure p_VS that can be adjusted by means of an actuator can be applied both to the control valve 3 and to the switching valve 4. When the switching valve 4 is in a first switch condition the actuating pressure p2 of the shifting element 2 can be regulated by means of the control valve 3 within a defined pilot pressure range. Above a certain value of the pilot pressure p_VS applied on a functional surface 6 of a valve slide 7 of the switching valve 4 the switching valve changes to a second switch condition, in which the actuating pressure p2 of the shifting element 2 corresponds to a supply pressure p_sys or system pressure that can be applied at the control valve 3. The actuating pressure p2 of the shifting element 2 can be applied on a functional surface 8 of a valve slide 9 or control valve slide of the control valve 3 in an action direction that reduces the actuating pressure p2.

On the valve slide 7 of the switching valve 4 there acts a spring force of a spring device 10 which opposes the pilot pressure p_VS. The result is that when the pilot pressure p_VS is zero the switching valve 4 moves to the switch position shown in FIG. 1, in which the pressure p2 of the working pressure area 11 in the area of the switching valve 4 is passed on completely in the direction of the functional surface 8 of the control valve slide 9. In this case the functional surface 8 of the control valve slide 9 and a functional surface 12 of the control valve slide 9 on which the pilot pressure p_VS is applied are matched to one another in such manner that when the pilot pressure p_VS is zero, the control valve slide 9 is moved by the actuating pressure p2 applied on the functional surface 8 to the position shown in FIG. 1, in which the working pressure area 11 is vented toward a substantially unpressurized low-pressure area 13 corresponding to an oil sump of the transmission. Thus, the actuating pressure p2 is reduced essentially to the pressure level of the low-pressure area 13. To prevent idling of the shifting element 2, upstream from the low-pressure area 13 the pressure level can be held at a pre-filling pressure by suitable measures. The actuator 5 is acted upon by an essentially constant reduction pressure p_red, so that the pilot pressure p_VS adopts a value between zero and the reduction pressure p_red, depending on the energization level of the actuator 5.

FIG. 2 shows a detailed longitudinally sectioned view of a first embodiment of a valve device 14, which comprises the control valve device 3 and the switching valve device 4. The valve slide 7 of the switching valve 4 and the valve slide 9 of the control valve 3 are arranged to move longitudinally in a common bore 15 of a valve housing 16 of the valve device 14 and are positioned coaxially to one another, with the valve slide 7 of the switching valve 4 arranged to move longitudinally in the valve slide 9 of the control valve 3. The switching valve slide 7 is an inner valve slide of the valve device 14, which is arranged concentrically in a control valve slide 9 that forms the outer valve slide of the valve device 14. The functional surface of the control valve slide 9 that can be acted upon by the pilot pressure p_VS is indexed 12. In the area 22 of the switching valve 7 a functional surface 6 is provided, which can also be acted upon by the pilot pressure p_VS.

The spring device 10 of the switching valve 4 is supported at one end on the control valve slide 9 and at the other end on the switching valve slide 7. On its end face opposite to the spring device 10, the switching valve slide 7 can be acted upon in the area of its functional surface 6, by way of an axial bore 17 provided in the control valve slide 9, by the pilot pressure p_VS. The system pressure p_sys, which constitutes a supply pressure signal, is applied on a first shifting tongue 18 of the valve housing 16, while the working pressure area 11 is connected to the valve device 14 in the area of a second shifting tongue 19 of the valve housing 16. In addition, in the area of a third shifting tongue 20 and in the area of a fourth shifting tongue 21 the valve device 14 is connected to the low-pressure area 13, the second shifting tongue 19 being positioned between the third shifting tongue 20 and the first shifting tongue 18 and the first shifting tongue 18 between the second shifting tongue 19 and the fourth shifting tongue 21.

FIG. 3 shows a variation of the actuating pressure p2 against the pilot pressure p_VS. In the operating condition of the valve device 14 shown in FIG. 2 the value of the pilot pressure p_VS is essentially zero and the valve slide 9 of the control valve 3 connects the second shifting tongue 19 with the third shifting tongue 20 via a section 23 with reduced diameter. As a result, both the actuating pressure p2 of the shifting element 2 and also its transmission capacity are essentially equal to zero.

The switching valve slide 7 is pressed by the spring device 10 with its functional surface 6 against the control valve slide 9, whereby the second shifting tongue 19 and the third shifting tongue 20 are connected to the functional surface 8 of the control valve slide 9 by way of radial bores 24 of the control valve slide 9 and the reduced-diameter section of the control valve slide 9 and via a reduced-diameter section of the switching valve slide 7 which, together with the control valve slide 9, delimit an annular space 26, in the area of which surface 8 the pressure p2 of the working pressure area 11 acts on the control valve slide 9 in a direction opposed to the pilot pressure p_VS.

Figure 4:
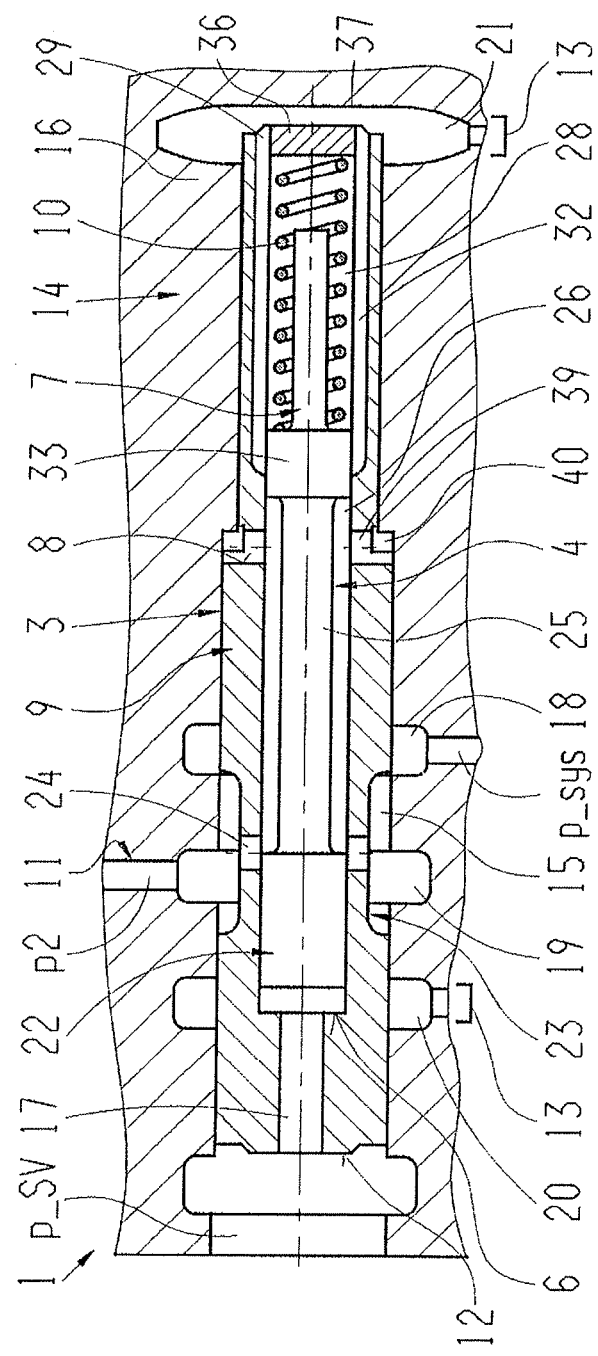
FIG. 4: A representation corresponding to FIG. 2, showing the valve device in a second operating condition.

With increasing pilot pressure p_VS, the switching valve slide 7 is pushed axially in the control valve slide 9 against the spring force of the spring device 10, in the manner shown in FIG. 4. At the same time the control valve slide 9 too is pushed by the pilot pressure p_VS acting on its functional surface 12, so that in the position of the control valve slide 9 shown in FIG. 4 the second shifting tongue 20 is no longer coupled via the reduced-diameter section 23 to the second shifting tongue 19, which is connected to the working pressure area 11.

Figure 5:
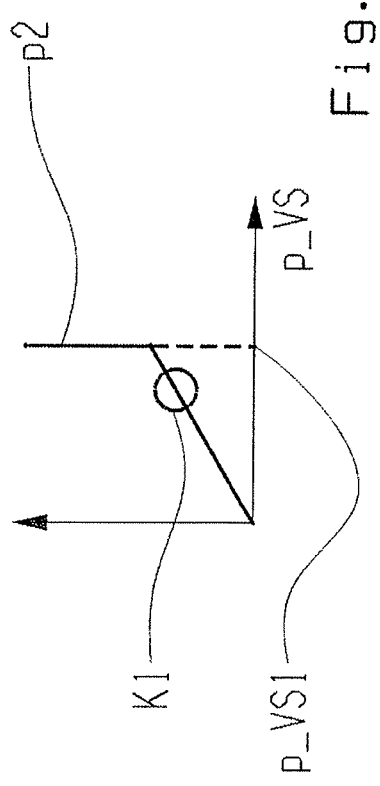
FIG. 5: A representation corresponding to FIG. 3, showing the variation of the pressure of the working pressure area, in which the operating condition of the valve device shown in FIG. 4 is characterized.

In the position of the control valve slide 9 shown in FIG. 4, the second shifting tongue 19 overlaps at least partially with the first shifting tongue 18, at which the system pressure p_sys is applied. This leads to an increase of the actuating pressure p2, which is approximately in the pressure region indicated in FIG. 5 by the circle K1. Since the second shifting tongue 19 is connected as before via the radial bores 24 of the control valve slide 9 and the annular space 26 between the control valve slide 9 and the switching valve slide 7 to the functional surface 8 of the control valve slide 9, the actuating pressure p2 is adjusted in a regulated manner by means of the valve slide 9 of the control valve 3.

When a pilot pressure value p_VS1 is reached, the control edge 35 opens and connects the functional surface 8 to the low-pressure area 13. At the same time the radial bores 24 are closed by the switching valve slide 7. As a result, in the manner shown in FIG. 6 the switching valve slide 7 is pushed by the pilot pressure p_VS, in opposition to the spring force of the spring device 10, completely with its end facing away from the functional surface 6 against the control valve slide 9. The consequence of this is that the control valve slide 9 is moved by the pilot pressure p_VS to the end position shown in FIG. 6, in which the overlap between the second shifting tongue 19 and the first shifting tongue 18 is at a maximum, whereby the actuating pressure p2 corresponds to the system pressure p_sys and thus has its maximum value. In the operating condition of the valve device 14 shown in FIG. 6 the regulating function of the control valve 3 is deactivated and the shifting element 2 is acted upon by its closing pressure level, at which the shifting element 2 has its full transmission capacity and operates essentially without slip, this again being indicated more precisely by the circle K1 in FIG. 7.

Figure 6:
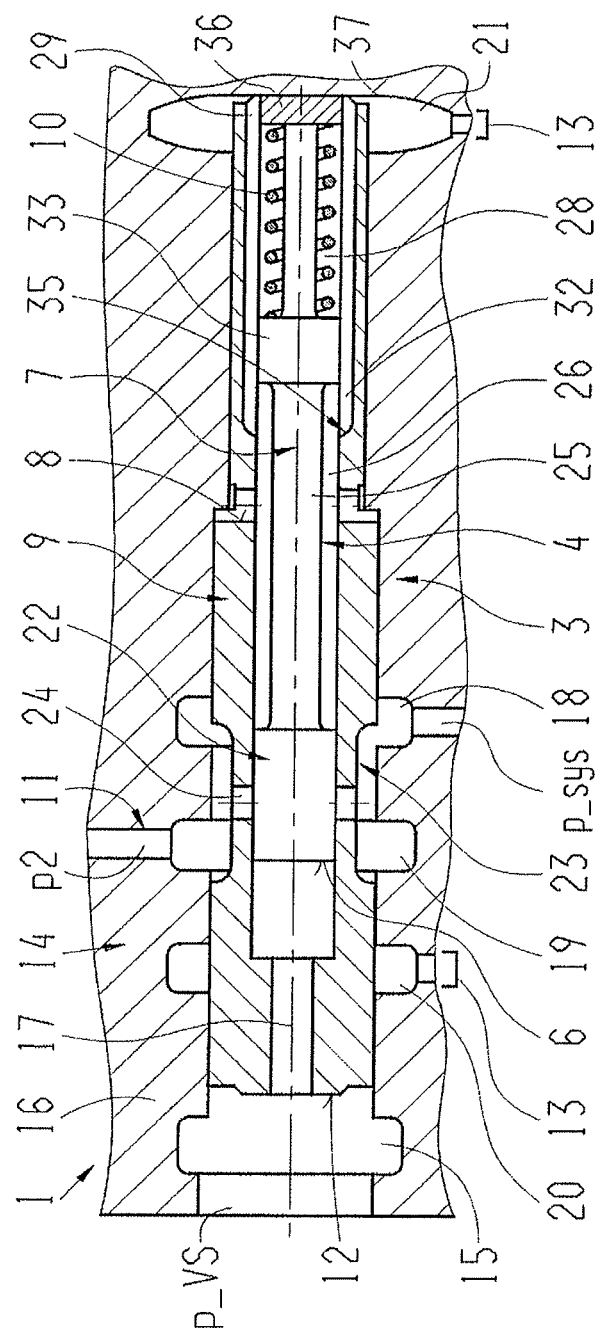
FIG. 6: A representation corresponding to FIG. 2, showing the valve device in a third operating condition.
Figure 7:
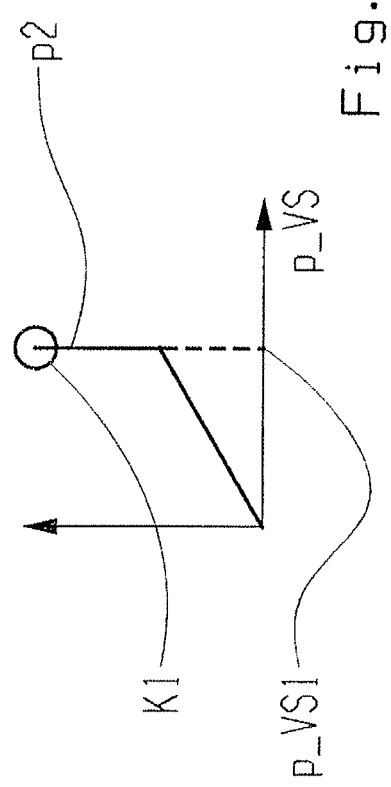
FIG. 7: A representation corresponding to FIG. 3, showing the variation of the pressure of the working pressure area, in which the operating condition of the valve device shown in FIG. 6 is characterized.

The deactivation of the regulating function of the control valve 3 in the operating condition of the valve device 14 shown in FIG. 6 is ensured in that in the switch position of the switching valve slide 7 in which the radial bores 24 are blocked, the annular space 26 is connected with a further annular space 28 delimited by the switching valve slide 7 and the control valve slide 9, which is functionally connected, via recesses 29 of the control valve slide 9, to the fourth shifting tongue 21, whereby both the pressure in the annular space 26 and the pressure in the annular space 28 decrease in the direction of the low-pressure area 13 and no appreciable pressure force acting in opposition to the pilot pressure p_VS is exerted on the control valve slide 9.

In the event of a corresponding demand to reduce the transmission capacity of the shifting element 2 or to open the shifting element 2 completely, the pilot pressure p_VS must be reduced or brought down completely to zero. The result of reducing the pilot pressure p_VS toward zero is that first the switching valve slide 7 is displaced by the spring device 10 in the control valve slide 9 away from its switch position shown in FIG. 6 and to its fully pushed-over switch position in the axial direction within the outer control valve slide 9, while the control valve slide 9 itself at first remains in the end position shown in FIG. 6. Beyond a defined axial displacement distance of the switching valve slide 7 relative to the control valve slide 9, the annular space 26 is again connected to the radial bores 24 of the control valve slide 9, whereby the actuating pressure p2 of the shifting element 2 is applied on the functional surface 8 of the control valve slide 9.

The functional surfaces 12 and 8 of the control valve slide 9 are matched to one another in such manner that the control valve slide 9 is displaced by the actuating pressure p2 now exerted on the functional surface 8, against the pilot pressure p_VS, away from the end position shown in FIG. 6 and the actuating pressure p2 is adjusted in a regulated manner, as a function of the pilot pressure p_VS, to a pressure value equivalent to the pilot pressure p_VS. If the pilot pressure p_VS is equal to zero, the control valve slide 9 is pushed to the second end position shown in FIG. 2, in which the functional surface 12 of the control valve slide 9 is in contact with the valve housing 16.

In the present case, connecting ducts 30 and 31 between the control valve 3 and the switching valve 4 are accommodated completely in the piston area or in the area between the valve housing 16 and the two valve slides 7 and 9, and not in the valve housing 16 itself, so that in this highly integrated and thus extremely compact configuration of the valve device 14, the duct layout is simpler than when the switching valve 4 and the control valve 3 are made separately, as is known from the prior art. Furthermore, the valve device 14 has the same valve connections as the systems known from the prior art.

The design of the valve device 14 described above also ensures that the functional surfaces 12 and 8, in the control pressure range or within the defined pilot pressure range, within which the actuating pressure p2 of the shifting element 2 can be adjusted in a regulated manner by means of the control valve 3, retain the same efficacy as if the switching valve 4 were not integrated in the control valve 3. Furthermore, the valve device 14 can be fitted as a preassembled group, so that the work involved with assembling a transmission can be reduced.

In the present case the valve device 14 is made of aluminum, so that depending on the application concerned the valve housing 16, the control valve slide 9 and the switching valve slide 7 can be made from an aluminum casting alloy or an aluminum wrought alloy. It is also possible to make the control valve slide 9 of the control valve 3 and/or the valve slide 7 of the switching valve 4 in each case from other suitable materials, for example plastic or the like.

In the valve device 14, control edges of the switching valve device 4 are formed by the switching valve slide 7 and the radial bores 24 and by grooves 32 of the control valve slide 9, which are provided in the area of the further annular space 28 and form a guide for the switching valve slide 7 together with a diameter section 33, without thereby blocking a connection between the annular space 26 and the fourth shifting tongue 21.

Figure 8:
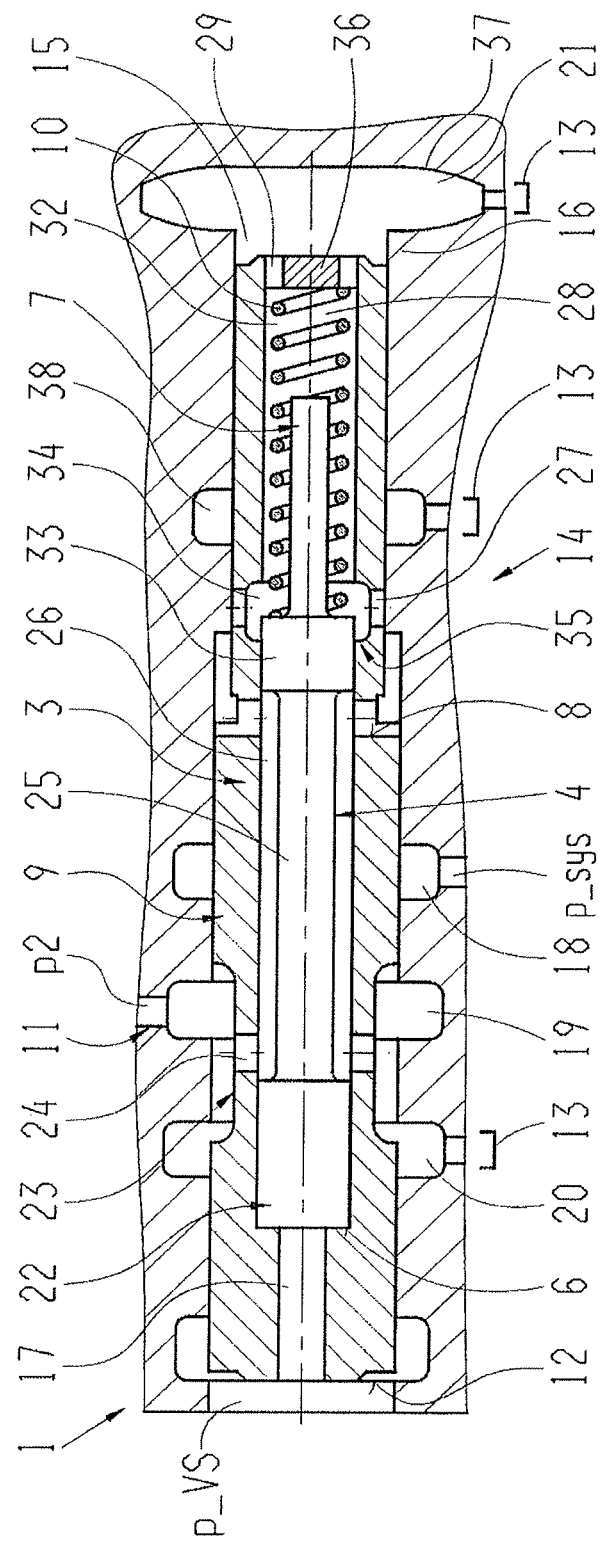
FIG. 8: A representation corresponding to FIG. 2, showing a second embodiment of the valve device of the hydraulic system in FIG. 1.
Figure 9:
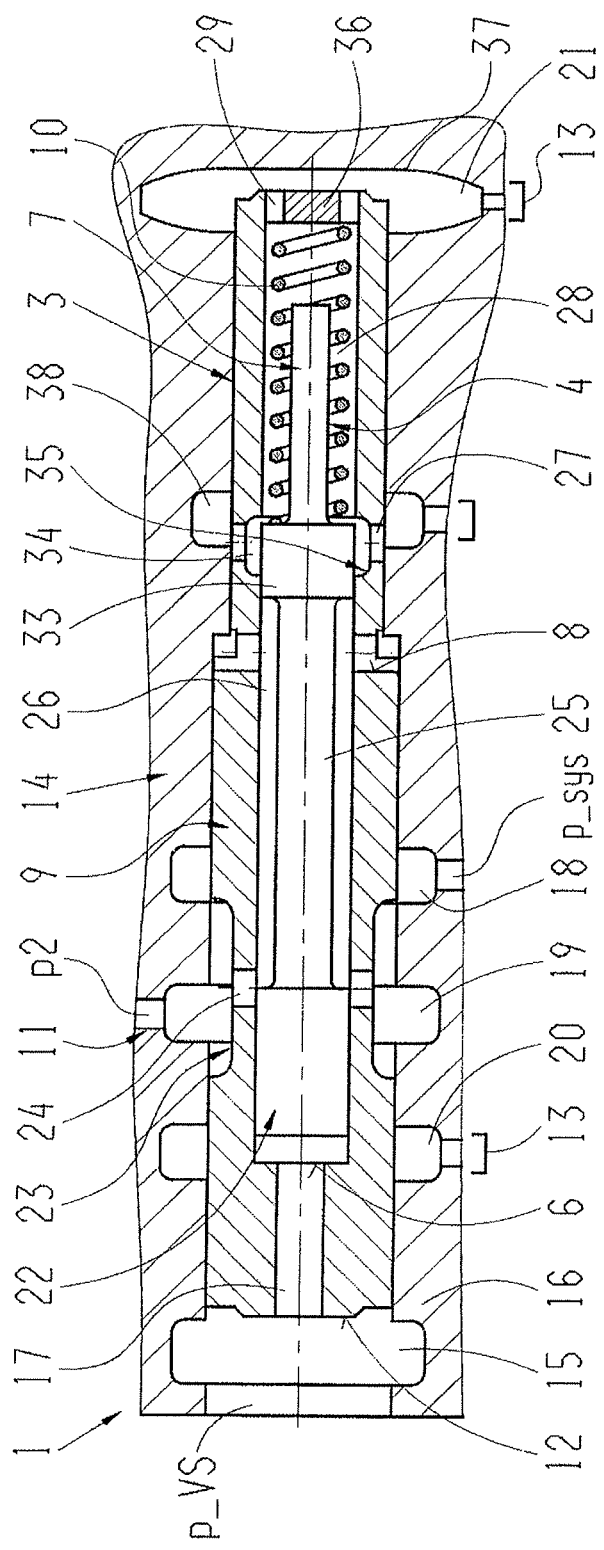
FIG. 9: A representation corresponding to FIG. 8, showing the second embodiment of the valve device in a second operating condition.
Figure 10:
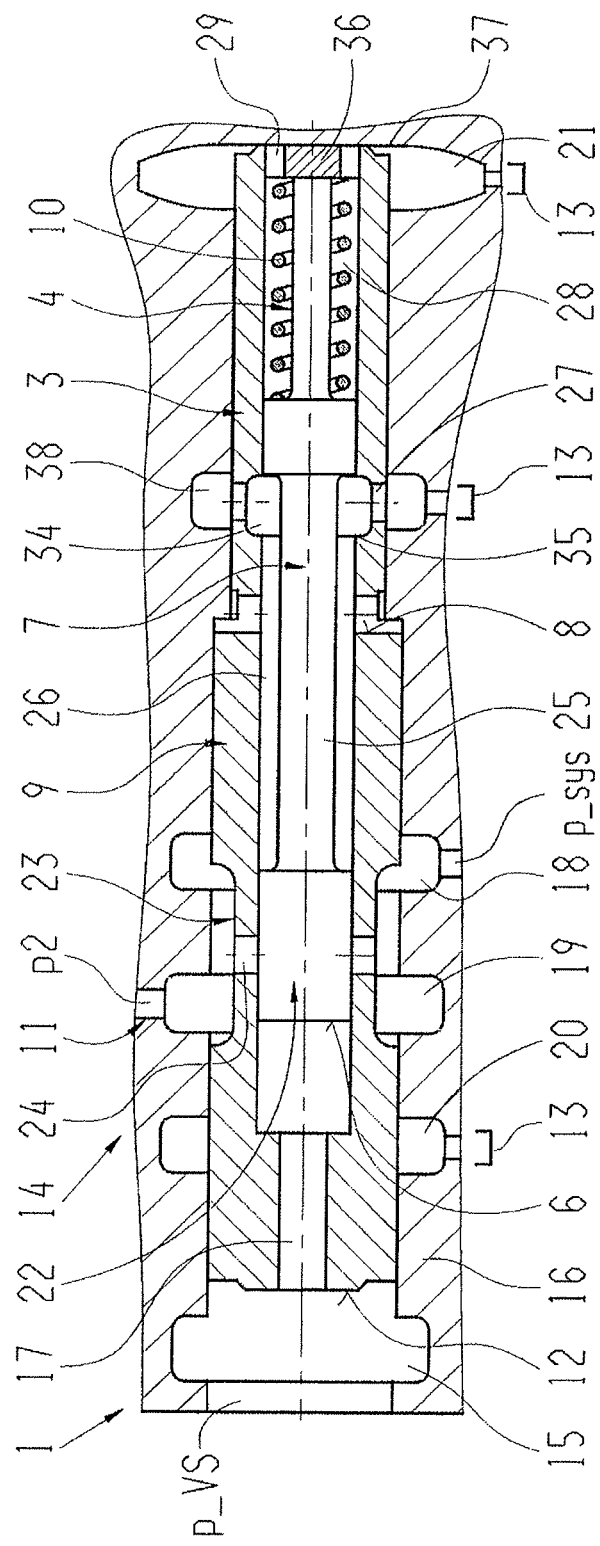
FIG. 10: The valve device of FIG. 8 in a third operating condition.

FIGS. 8 to 10 show a second example embodiment of the valve device 14, which essentially corresponds to the first example embodiment of the valve device 14 described with reference to FIGS. 2 to 7 and in which the control valve slide 9, in the area of its inner envelope surface facing toward the switching valve slide 7, is formed with an annular groove 34 in order to provide a defined control edge 35 between the switching valve slide 7 and the control valve slide 9. FIG. 8 shows the valve device 14 in an operating condition corresponding in effect to the operating condition shown in FIG. 2, while FIG. 9 shows the valve device 14 in an operating condition corresponding to FIG. 4 and FIG. 10 shows it in an operating condition corresponding to FIG. 6.

The annular groove 34 is the opening area of further radial bores 27 of the control valve slide 9 by way of which, depending on the switch position of the switching valve slide 7 and of the control valve slide 9 at the time, the annular space 26 can be brought into functional connection with a further shifting tongue 38 which is connected to the low-pressure area 13. In this case the regulating function of the valve device is activated when the annular space 26 is cut off from the shifting tongue 38, whereas the regulating function is deactivated when the annular space 26 is connected to the shifting tongue 38.

For the sake of clarity, with regard to the other functional modes of the valve device 14 according to FIGS. 8 to 10, reference should be made to the description relating to FIGS. 2 to 7.

Figure 11:
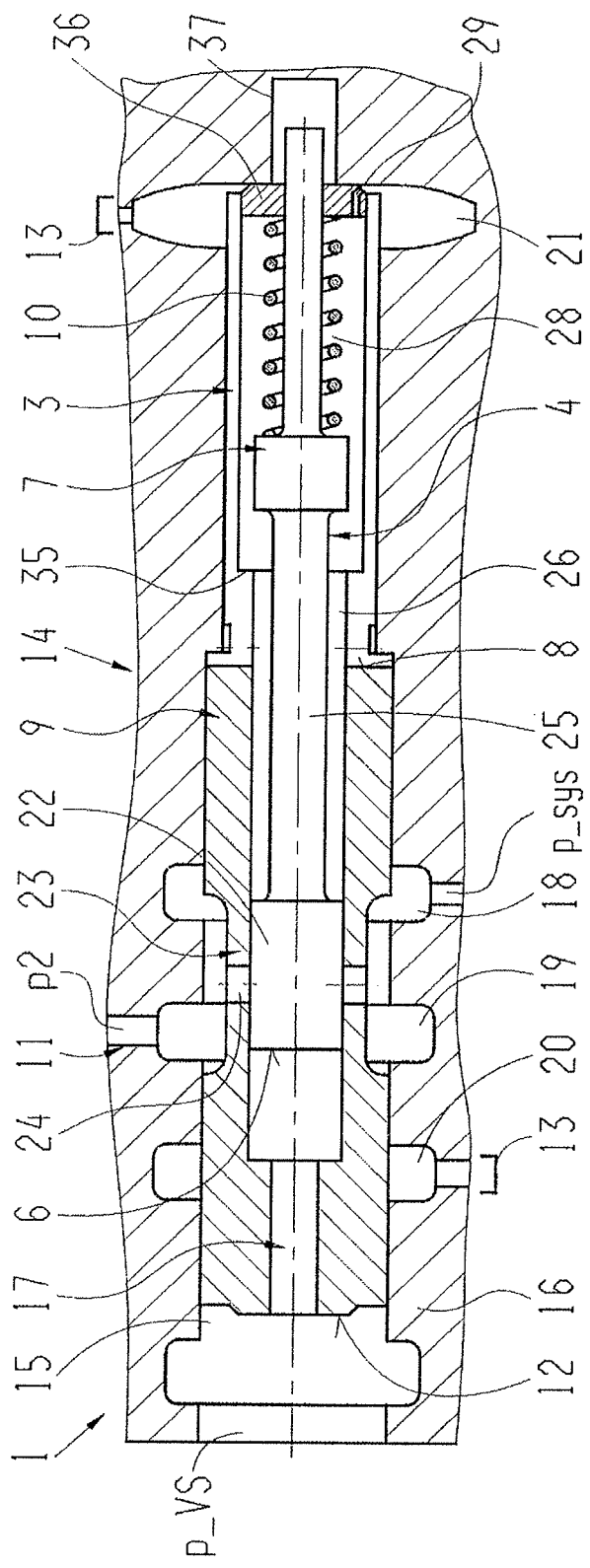
FIG. 11: A representation corresponding to FIG. 2, showing a third embodiment of the valve device of the hydraulic system of FIG. 1.

FIG. 11 shows a third example embodiment of the valve device 14, which essentially corresponds to the two embodiments of the valve device 14 described above and comprises a further design feature of the defined control edge 35. The valve device 14 of FIG. 11 is made with an all-round control edge 35 and without the longitudinal grooves 32 in the area of the control valve slide 9. In order nevertheless to be able to ensure a guiding of the switching valve slide 7 as necessary for the function of the valve device 14, compared with the other two embodiments of the valve device 14, the switching valve slide 7 with its end facing away from the functional surface 6 can pass through the control valve slide 9 and in an end area 36 of the control valve slide 9 is guided in the radial direction by a slide bearing device. An area 37 of the valve housing 16 forms an axial end-stop for the switching valve slide 7, which in the other two embodiments of the valve device 14 is constituted by the end area 36 of the control valve slide 9. With regard to the other functions of the valve device 14 in FIG. 11, again reference should be made to the description relating to FIGS. 2 to 7.

INDEXES

1 Hydraulic system
2 Shifting element
3 Control valve device
4 Switching valve device
5 Actuator
6 Functional surface
7 Valve slide of the switching valve device, switching valve slide
8 Functional surface
9 Valve slide of the control valve device, control valve slide
10 Spring device
11 Working pressure area
12 Functional surface of the control valve slide
13 Low-pressure area
14 Valve device
15 Bore 16 Valve housing
17 Axial bore of the control valve slide
18 to 21 Shifting tongues
22 Area
23 Reduced-diameter section of the control valve slide
24 Radial bore
25 Reduced-diameter section of the switching valve slide
26 Annular space
27 Further radial bores
28 Further annular space
29 Recess of the control valve slide
30, 31 Connection duct
32 Longitudinal groove
33 Diameter section of the switching valve slide
34 Annular groove
36 Defined control edge
36 End area of the control valve slide
37 End-stop area of the valve housing
38 Further shifting tongue
39 Radial bores from the annular space 26 to the annular space 53
40 Annular space on the functional surface 8 formed by stepped bore in the valve housing and the control valve slide 9
K1 Circle
p2 Pressure of the working pressure area, actuating pressure
p_red Reducing pressure
p_sys System pressure
p_VS Pilot pressure
p_VS1 Pilot pressure value

The invention claimed is:

1. A valve device (14) of a hydraulic system (1) for actuating at least one shifting element (2) of a transmission, the valve device comprising:
   a pilot-controlled control valve device (3) having an outer valve slide (9) and, functionally connected therewith, a pilot-controlled switching valve device (4) having an inner valve slide (7),
   wherein the outer valve slide has at least one axial end that moves longitudinally in a common bore (15) of a valve housing (16) and the inner valve slide is arranged to move longitudinally in the common bore of the valve housing, the outer valve slide and the inner valve slide are positioned coaxially with one another, and
   the inner valve slide (7) is arranged to move longitudinally at least partially within the outer valve slide (9);
   the inner valve slide (7) is acted upon by a spring device (10) with a restoring spring force that acts in a direction of a defined initial position; and
   the spring device (10) is supported at one end thereof on the inner valve slide (7) and an opposite end of the spring, device is supported on the at least one axial end of the outer valve slide (9) that moves longitudinally in the common bore of the valve housing; the inner and the outer valves slides (7, 9) are each acted upon in an area of a functional surface (6, 12) by a pilot pressure (p_VS), such that the pilot pressure (p_VS) is applied via an axial bore (17) of the outer valve slide (9) onto the functional surface (6) of the switching valve slide (7), which is arranged at least partially within the outer valve slide (9) with an area (22) comprising the functional surface (6) that is acted upon by the pilot pressure (p_VS).

2. The valve device according to claim 1, wherein a supply pressure signal (p_sys) is applied on a first shifting tongue (18) of the valve housing (16), which is functionally connectable, via a reduced-diameter section (23) of the outer valve slide (9), with a second shifting tongue (19) of the valve housing (16), to which a working pressure area (11) of the shifting element (2) is connected.

3. The valve device according to claim 2, wherein the second shifting tongue (19) is functionally connectable, via the reduced-diameter section (23) of the outer valve slide (9), with a third shifting tongue (20), which is connected to a low-pressure area (13).

4. The valve device according to claim 2, wherein a pressure (p2) of the working pressure area (11) of the shifting element (2) is controllable by the control valve device (3) within a defined pilot pressure range and, when the switching valve (4) is in a first switch condition, and above a pilot pressure value (p_VS1) that is applied on the functional surface (6) of the valve slide (7) of the switching valve (4), the switching valve (4) moves to a second switch condition in which the pressure (p2) of the working pressure area (11) of the shifting element (2) corresponds to the supply pressure signal (p_sys) that is applied at the control valve device (3).

5. The valve device according to claim 1, wherein the valve housing (16) is made of aluminum.

6. The valve device according to claim 1, wherein the valve housing (16) is made of an aluminum casting alloy.

7. The valve device according to claim 1, wherein at least the outer valve slide (9) is made of either aluminum or an aluminum casting alloy.

8. The valve device according to claim 1, wherein at least the inner valve slide (7) comprises either aluminum or an aluminum wrought alloy.

9. The valve device according to claim 1, wherein an outer envelope surface of the outer valve slide (9), that co-operates with the valve housing (16), and an outer envelope surface of the inner valve slide (7), that co-operates with an inner envelope surface of the outer valve slide (9), are strengthened by hard anodizing, and an entirety of the outer valve slide is longitudinally movable in the common bore of the valve, housing.

10. The valve device according to claim 1, wherein the outer valve slide is the outer valve slide (9) of the control valve device (3) and the inner valve slide is the inner valve slide (7) of the switching valve device (4).

11. A valve device (14) of a hydraulic system (1) for actuating at least one shifting element (2) of a transmission, the valve device comprising:
   a pilot-controlled control valve device (3) having an outer valve slide (9) and, functionally connected therewith, a pilot-controlled switching valve device (4) having an inner valve slide (7);
   an entirety of the outer and the inner valve slides (7, 9) are arranged to move longitudinally in a common bore (15) of a valve housing (16) and are positioned coaxially with one another;
   the inner valve slide (7) is arranged to move longitudinally at least partially within the outer valve slide (9); each of the inner and outer valve slides has a first functional surface which is exposed to a pilot pressure, the pilot pressure passing through an axial bore of the outer valve slide to impinge on the functional surface of the inner valve slide, the pilot pressure applies a force on the first functional surfaces of the inner and outer valve slides directed in a first axial direction; the inner valve slide is axially biased by a spring, a first end of the spring abuts the inner valve slide and an opposite second end of the valve spring abuts an end of the outer valve slide;
   a supply pressure signal (p_sys) is applied on a first shifting tongue (18) of the valve housing (16), which is functionally connectable, via a reduced-diameter section (23) of the outer valve slide (9), with a second shifting tongue

(19) of the valve housing (16), to which a working pressure area (11) of the shifting element (2) is connected;

via a bore (24) in an area of the reduced-diameter section (23) of the outer valve slide (9) and via a reduced-diameter section (25) of the inner valve slide (7) which, together with the outer valve slide (9), delimit an annular space (26), and the second shifting tongue (19) is connectable to a second functional surface (8) of the outer valve slide (9) in an area of which the pressure (p2) of the working pressure area (11) is applied on the outer valve slide (9) in an action direction opposing the pilot pressure (p_VS).

12. The valve device according to claim 11, wherein the annular space (26) is connectable, via the inner valve slide (7), to a further annular space (28) delimited by the inner valve slide (7) and the outer valve slide (9), and the further annular space (28) is connected to the low-pressure area (13).

13. A valve device of a hydraulic system for actuating at least one shifting element of a transmission, the valve device comprising:

a valve housing having a housing bore that defines an axis;

a control valve device being controllable by a pilot pressure, and the control valve device comprising an outer valve slide having an axial bore;

a switching valve device being controllable by the pilot pressure and comprising an inner valve slide;

the control valve device and the switching valve device being functionally connected to one another and coaxially aligned within the housing bore;

the outer valve slide being slidably supported within the housing bore by the valve housing and the inner valve slide being slidably supported within the axial bore of the outer valve slide such that the inner valve slide and an entirely of the outer valve slide are axially slidable in relation to one another and the valve housing; and the inner valve slide is axially biased by a spring, a first end of the spring abuts the inner valve slide and an opposite second end of the valve spring abuts an end of the outer valve slide; wherein each of the inner and the outer valve slides has a functional surface which is exposed to a pilot pressure, the pilot pressure passing through the axial bore of the outer valve slide to impinge on the functional surface of the inner valve slide, and the pilot pressure applies a force on the functional surfaces of the inner and the outer valve slides directed in an axial direction.

14. The valve device according to claim 13, wherein the spring is supported within the outer valve slide, one end of the spring abuts the inner valve slide on a side opposite the functional surface of the inner valve slide and an opposite end of the spring abuts the outer valve slide such that the spring applies a force on the inner and the outer valve slides directed in opposite axial directions.

15. The valve device according to claim 13, wherein the housing bore comprises first and second shifting tongues, a supply pressure signal is conductible to the first shifting tongue, the first shifting tongue is functionally connectable, via a reduced-diameter section of the outer valve slide, with the second shifting tongue which is connected to a working pressure area of the shifting element.

* * * * *